United States Patent Office 3,657,283
Patented Apr. 18, 1972

3,657,283
MANUFACTURE OF BZ-1-BZ-1'-DIBENZ-ANTHRONYL SULFIDES
Helmut Schmidt and Alfred Schuhmacher, Ludwigshafen, Germany, assignors to Badische Anilin- & Soda-Fabrik Aktiengesellschaft, Ludwigshafen (Rhine), Germany
No Drawing. Filed Mar. 2, 1970, Ser. No. 15,882
Claims priority, application Germany, Mar. 5, 1969,
P 19 11 086.2
Int. Cl. C09b 3/12
U.S. Cl. 260—363         3 Claims

ABSTRACT OF THE DISCLOSURE

Production of Bz-1-Bz-1'-dibenzanthronyl sulfides from halogen-substituted Bz-1-benzanthrones characterized by the use of an ether alcohol as solvent and of an alkali metal sulfide.

---

This invention relates to an improved process for the production of Bz-1-Bz-1'-dibenzanthronyl sulfides.

Bz-1-Bz-1'-dibenzanthronyl sulfide and its derivatives are important intermediates in the manufacture of vat dyes. For example, isomer-free isodibenzanthrones (isoviolanthrones or isothrenes) may only be produced by reacting such Bz-1-Bz-1'-benzanthronyl sulfides in an alcoholic potassium hydroxide melt. Isodibenzanthrone provides valuable violet and blue vat dyes on halogenation or on oxidation followed by etherification of the hydroxyl groups formed.

Several methods of producing Bz-1-Bz-1'-dibenzanthronyl sulfides have been known for many years.

Thus Bz-1-Bz-1'-benzanthronyl sulfides are obtained when benzanthrone or substitution products thereof are reacted with sulfur dichloride in inert solvents (German Pat. No. 441,748). However, this method also leads to the formation of Bz-1-benzanthronyl mercaptans, but these may be converted to Bz-1-Bz-1'-benzanthronyl sulfides by further reaction with Bz-1-bromobenzanthrone or Bz-1-nitrobenzanthrone (German Pat. No. 441,709) or by heating (German Pat. No. 442,415).

It is further known to react Bz-1-halobenzanthrones with alkali metal sulfides in melts of organic acid salt (German Pat. No. 925,892) or directly in molten alkali metal sulfide and sulfur (German Pat. No. 443,022) to form Bz-1-Bz-1'-benzanthronyl sulfide.

Industrially, the most important process is that involving the reaction of Bz-1-halobenzanthrones with an aqueous polysulfide solution, prepared by heating sodium sulfide, sulfur and optionally soda ash, on the lines of the process described in German Pat. No. 443,022.

To avoid fusion or agglutination of the reaction products and to prevent the reaction mixture from foaming in a troublesome manner, it is usual to add an alcohol such as methyl or ethyl alcohol. This has the drawback, however, of making it necessary to operate in pressure vessels, since the reaction must be carried out at temperatures above 100° C. Another disadvantage of this process is that the polysulfides, which are used in great excess, cause considerable labor and other expenses for their removal in the process of working up the reaction mixture.

We have now found that Bz-1-Bz-1'-dibenzanthronyl sulfides may be produced in a very much simpler and chaper manner from Bz-1-halobenzanthrones by reacting the latter with stoichiometric or large amounts of alkali metal sulfide in mono- or polyhydric water-soluble ether alcohols of the general formula:

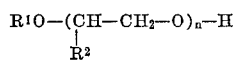

where $R^1$ stands for hydrogen or an alkyl radical of 1 to 4 carbon atoms, $R^2$ stands for hydrogen or a methyl group and $n$ is 1 or preferably 2, 3 or 4.

Examples of suitable alkyl radicals of 1 to 4 carbon atoms designated by $R^1$ are methyl, ethyl, n-propyl, isopropyl, n-butyl and iso-butyl.

The ether alcohols of the above formula may be readily obtained from ethylene oxide or propylene oxide. Specific examples of such ether alcohols are: methyl or ethyl diglycol, ethyl or butyl triglycol, ethyl tetraglycol and preferably diethylene glycol or dipropylene glycol. Mixtures of these compounds may also be used.

Examples of Bz-1-halobenzanthrones are Bz-1-chlorobenzanthrone, Bz-1-6-dichlorobenzanthrone and, in particular, the corresponding bromo compounds. Other suitable compounds are Bz-1-bromo-2-methoxybenzanthrone, Bz-1-bromo-6-aminobenzanthrone and Bz-1-bromo-2-ethylbenzanthrone.

The alkali metal sulfide used is for example potassium sulfide and preferably sodium sulfide. To effect the reaction in our new process only stoichiometric amounts of alkali metal sulfide are necessary, although a slight excess of, say, 0.1 to 0.2 equivalents is convenient.

The ether alcohols are conveniently used in proportions ranging from 1 to 2 parts per part of Bz-1-halobenzanthrone.

The process of the invention may be conveniently carried out, for example, by heating the alkali metal sulfide, e.g. sodium sulfide (commercial quality, usually of 60% purity, is adequate), together with the ether alcohol or ether alcohols and dissolving at 70° to 90° C. The Bz-1-halobenzanthrone is then added at a temperature of from 80° to 100° C. The Bz-1-Bz-1'-benzanthronyl sulfides form at temperatures between 110° and 160° C. and usually between 120° and 130° C., and their formation is complete in about 1 to 5 hours. When the reaction is complete, the melt is diluted with water and the resulting Bz-1-Bz-1'-dibenzanthronyl sulfide removed by filtration. The ether alcohols used may be recovered after dehydration by distillation.

Our new process has the following advantages over the hitherto known processes for the manufacture of Bz-1-Bz-1'-dibenzanthronyl sulfides:

(1) Reduction of the volume of the reaction mixture to about one tenth to one eighth of previous volumes;
(2) Reduction of the reaction time by about 75%;
(3) Reaction may be conducted without the use of pressure vessels;
(4) Expensive removal of hitherto obtained sulfide-containing and polysulfide-containing reaction solutions unnecessary, as only stoichiometric or slightly larger quantities of alkali metal sulfide are used.

In the following examples the parts and percentages are by weight.

EXAMPLE 1

To 140 parts of methyl diglycol there are added 20 parts of 60% sodium sulfide and a solution is formed by heating at 80° C. At 90° C. there are added 100 parts of Bz-1-bromobenzanthrone, and the melt is then heated at 125° C. After only 30 minutes only slight quantities of the halogen compound can be detected. After the addition of a further 1 part of sodium sulfide and heating for one more hour, the reaction is complete. After cooling to 100° C., the melt is diluted with 140 parts of water and filtered at 70° C.

The filtered material is washed until neutral and dried. There are thus obtained 77 parts of Bz-1-Bz-1'-benzanthronyl sulfide, M.P. 327–329° C. Treatment of a sample with sodium sulfide solution gives extraction of only 0.9% of the sample, which means that the percentage of sodium Bz-1-benzanthronyl mercaptan in the sample is about 1%.

EXAMPLE 2

680 Parts of diethylene glycol and 96 parts of 60% sodium sulfide are heated to 90° C. and stirred for 30 minutes at that temperature. 600 parts of Bz-1-dibromobenzanthrone are added and the mixture is heated to 125° C. The melt is maintained at 125° C. for 3 hours. 8 parts of sodium sulfide are then added and the melt is stirred for a further 2 hours at 125° C. The melt is then cooled to 100° C. and diluted with 700 parts of water. After working up in the usual manner and drying, there are obtained 480 parts of 6,6'-dibromobenzanthronyl sulfide, 96% of theory on the dibromobenzanthrone compound used.

Analysis gave the following results: Br (theory): 24.1%; S, 4.8%. Found: Br, 24.5%; S, 5.5%.

We claim:
1. In a process for the manufacture of Bz-1-Bz-1'-dibenzanthronyl sulfides from halogen-substituted Bz-1-benzanthrones the improvement which comprises reacting the halogen-substituted Bz-1-benzanthrones with a stoichiometric amount or slight excess of an alkali metal sulfide in a mono- or bifunctional ether alcohol of the general formula:

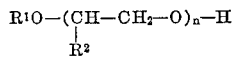

where $R^1$ stands for hydrogen or an alkyl group of 1 to 4 carbon atoms, $R^2$ stands for hydrogen or a methyl group and $n$ is an integer from 1 to 4 inclusive.

2. In the process as claimed in claim 1 the use of diethylene glycol or dipropylene glycol as said ether alcohol.

3. In the process as claimed in claim 1, the halogen-substituted Bz-1-benzanthrone being a bromo-substituted Bz-1-benzanthrone.

References Cited
FOREIGN PATENTS
925,892   3/1955   Germany _____ 260—363

LORRAINE A. WEINBERGER, Primary Examiner

E. J. SKELLY, Assistant Examiner

U.S. Cl. X.R.

260—358; 364